(12) United States Patent
Beheydt et al.

(10) Patent No.: US 10,848,538 B2
(45) Date of Patent: Nov. 24, 2020

(54) SYNCHRONIZED SOURCE SELECTION FOR ADAPTIVE BITRATE (ABR) ENCODERS

(71) Applicant: Cisco Technology, Inc., San Jose, CA (US)

(72) Inventors: Samie Beheydt, Geluwe (BE); Henk Derudder, Ypres (BE); Carol E. Iturralde, Framingham, MA (US)

(73) Assignee: Cisco Technology, Inc., San Jose, CA (US)

( * ) Notice: Subject to any disclaimer, the term of this patent is extended or adjusted under 35 U.S.C. 154(b) by 420 days.

(21) Appl. No.: 15/823,884

(22) Filed: Nov. 28, 2017

(65) Prior Publication Data

US 2019/0166178 A1    May 30, 2019

(51) Int. Cl.
*H04L 29/06* (2006.01)

(52) U.S. Cl.
CPC ........ *H04L 65/605* (2013.01); *H04L 65/4084* (2013.01); *H04L 65/607* (2013.01); *H04L 65/608* (2013.01)

(58) Field of Classification Search
CPC ... H04L 65/605; H04L 65/607; H04L 65/608; H04L 65/4084
USPC ........................................................ 709/219
See application file for complete search history.

(56) References Cited

U.S. PATENT DOCUMENTS

| | | | |
|---|---|---|---|
| 7,139,999 B2 | 11/2006 | Bowman-Amuah | |
| 8,639,971 B1 | 1/2014 | White | |
| 9,100,700 B2 | 8/2015 | Major | |
| 9,432,704 B2 | 8/2016 | Mutton | |
| 9,467,708 B2 | 10/2016 | Soroushian | |
| 9,706,509 B2 | 7/2017 | Beheydt et al. | |
| 2004/0172478 A1 | 9/2004 | Jacobs | |
| 2005/0246612 A1 | 11/2005 | Leis | |
| 2007/0033154 A1 | 2/2007 | Trainum | |
| 2007/0050336 A1 | 3/2007 | Bugir | |
| 2007/0180528 A1 | 8/2007 | Kane | |
| 2008/0086773 A1 | 4/2008 | Tuvell | |
| 2008/0155390 A1 | 6/2008 | Karim | |
| 2008/0273504 A1 | 11/2008 | Foley | |
| 2009/0119499 A1 | 5/2009 | Cao | |
| 2010/0146040 A1 | 6/2010 | Ramakrishnan et al. | |
| 2010/0191539 A1 | 7/2010 | Loughery, III | |

(Continued)

OTHER PUBLICATIONS

Notice of Allowance dated May 10, 2019 cited in U.S. Appl. No. 14/213,156, 14 pgs.

(Continued)

*Primary Examiner* — Glenton B Burgess
*Assistant Examiner* — Marshall M McLeod
(74) *Attorney, Agent, or Firm* — Merchant & Gould P.C.

(57) ABSTRACT

Synchronized source selection for adaptive bitrate (ABR) encoders may be provided. First, a first adaptive transport stream (ATS) that is aligned with a second ATS produced by a second device may be provided from a first source by a first device. The first device may be fed from the first source. Next, an indication that the second device switched from being fed from the first source to being fed from a second source may be received. In response to receiving the indication, the first device may be switched from being fed from the first source to being fed from the second source. The first ATS that is aligned with the second ATS produced by the second device may then be produced from the second source by the first device.

16 Claims, 8 Drawing Sheets

(56) References Cited

U.S. PATENT DOCUMENTS

| | | |
|---|---|---|
| 2010/0218033 A1 | 8/2010 | Safar et al. |
| 2011/0009991 A1 | 1/2011 | Dinicola |
| 2011/0050990 A1 | 3/2011 | Farkash |
| 2011/0083037 A1* | 4/2011 | Bocharov ........ H04N 21/23116 714/4.11 |
| 2011/0225417 A1 | 9/2011 | Maharajh |
| 2011/0235703 A1 | 9/2011 | Labrozzi et al. |
| 2011/0252233 A1 | 10/2011 | De Atley |
| 2011/0314130 A1 | 12/2011 | Strasman |
| 2012/0011270 A1 | 1/2012 | Priddle et al. |
| 2012/0023251 A1 | 1/2012 | Pyle et al. |
| 2012/0117225 A1 | 2/2012 | Kordasiewicz et al. |
| 2012/0128061 A1 | 5/2012 | Labrozzi et al. |
| 2012/0159098 A1 | 6/2012 | Cheung |
| 2012/0265856 A1 | 10/2012 | Major et al. |
| 2013/0227573 A1 | 8/2013 | Morsi et al. |
| 2013/0232289 A1 | 9/2013 | Zhong |
| 2013/0315567 A1 | 11/2013 | Narayanan et al. |
| 2014/0006854 A1 | 1/2014 | Bello |
| 2014/0006951 A1 | 1/2014 | Hunter |
| 2014/0013349 A1 | 1/2014 | Millar et al. |
| 2014/0019587 A1 | 1/2014 | Giladi |
| 2014/0025710 A1 | 1/2014 | Sarto |
| 2014/0059243 A1 | 2/2014 | Reisner |
| 2014/0079207 A1 | 3/2014 | Zhakov |
| 2014/0140417 A1 | 5/2014 | Shaffer et al. |
| 2015/0040169 A1 | 2/2015 | Hoffert |
| 2015/0256617 A1 | 10/2015 | Klose |
| 2016/0316235 A1* | 10/2016 | Van Veldhuisen .......... H04N 21/2368 |

OTHER PUBLICATIONS

Dr. Gorry Fairhurst, "MPEG-2 Transmission," Jan 2001, 7 pages; http://www.erg.abdn.ac.uk/future-net/digital-video/mpeg2-trans.html (9 pgs).

Wikipedia, the free encyclopedia, "MPEG transport stream," Wikipedia, Feb. 26, 2013, 7 pages; http://en.wikipedia.org/wiki/MPEG_transport_stream.

Cable Television Laboratories, Inc., OpenCable tm Specifications, OC-SP-EBP=I01-130118, Jan. 18, 2013 (31 pgs).

Wikipedia, the free encyclopedia, Presentation time stamp, Wikipedia, May 27, 2012, 1 page; http://en.wikipedia.org/wiki/Presentation_time-stamp (1 pg.).

Chinese Second Office Action issued in Application No. 201580013828.3 dated Feb. 24, 2019, 8 pp.

* cited by examiner

SYNCHRONIZED SOURCE SELECTION FOR ADAPTIVE BITRATE (ABR) ENCODERS

TECHNICAL FIELD

The present disclosure relates generally to synchronized source selection.

BACKGROUND

Adaptive bitrate (ABR) streaming is a method of video streaming over Hypertext Transfer Protocol (HTTP) where the source content is encoded at multiple bit rates, then each of the different bit rate streams are segmented into small multi-second parts. The streaming client is made aware of the available streams at differing bit rates, and segments of the streams by a manifest file. When starting, the client typically requests the segments from the lowest bit rate stream. If the client finds the download speed is greater than the bit rate of the segment downloaded, then it may request the next higher bit rate segments. Later, if the client finds the download speed for a segment is lower than the bit rate for the segment, and therefore the network throughput has deteriorated, then it may request a lower bit rate segment. The segment size can vary depending on the particular implementation, but they are typically between two and ten seconds.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Synchronized source selection for adaptive bitrate (ABR) encoders may be provided. First, a first adaptive transport stream (ATS) that is aligned with a second ATS produced by a second device may be provided from a first source by a first device. The first device may be fed from the first source. Next, an indication that the second device switched from being fed from the first source to being fed from a second source may be received. In response to receiving the indication, the first device may be switched from being fed from the first source to being fed from the second source. The first ATS that is aligned with the second ATS produced by the second device may then be produced from the second source by the first device.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

For Adaptive Bitrate (ABR) encoding (or transcoding), audio and video may be encoded by ABR encoders/transcoders as chunks comprising short sequences that may be independently decoded. For high availability, a one-to-one redundancy architecture may be used. In the one-to-one redundancy architecture, a main ABR encoder/transcoder may be backed-up by a second (i.e., redundant) ABR encoder/transcoder. The main ABR encoder/transcoder and the back-up ABR encoder/transcoder may be used in a hot-hot configuration where both ABR encoders/transcoders may output the same service at the same time. The redundant ABR encoder/transcoder may be feeding redundant downstream ABR packagers.

These redundant encoders/transcoders may place their video chunk boundaries on the same video frames and their audio chunk boundaries on the same audio samples (i.e., the ABR profiles of the encoders/transcoders may be "aligned"). This may allow downstream redundant packagers to generate ABR segments that may be interchanged (i.e., segments from one packager may be mixed with segments from another packager by a downstream client). The placement of the aforementioned boundaries may be based upon timestamps present in the input (i.e., the source). In order for redundant ABR encoding/transcoding to work, both main and back-up encoders/transcoders may need to receive a source with aligned input timestamps.

Consistent with embodiments of the disclosure, in order to increase error resiliency of the aforementioned redundant ABR encoder/transcoder system, source redundancy may also be used at the ABR encoder/transcoder input. Source redundancy may comprise using multiple sources (e.g., a main source and a backup source). For example, in case the main source fails, an ABR encoder/transcoder may switch from the main to the backup source.

One issue with source redundancy may comprise the main source and the backup source feeding an end-to-end video delivery chain not containing the same timestamps (e.g., they may originate from two independent upstream encoders). In this situation, if the main ABR encoder/transcoder switches to the backup source while the redundant ABR encoder/transcoder stays on the main source, the redundant ABR encoders/transcoders may no longer generate aligned ABR output profiles because the source timestamps may not match. From this point onwards, an interruption may be visible by viewers of the content. Furthermore, the interruption may not only be visible to live viewers, but may also be visible to viewers who watch the content at a later time. This may be because the same misaligned chunks may have been cached in the edge of a Content Deliver Network (CDN) or have been recorded (e.g., via a cloud Digital Video Recorder (cDVR)).

This issue may impact virtually any service provider supporting Internet Protocol (IP) video. For live viewing, this may be a case where thousands or tens of thousands of subscribers are "tuned" in and watching. Accordingly, outages should be avoided (or minimized), especially at a "head-end". This may be achieved by a form of redundancy of both encoders/transcoders as well as their input sources. Embodiments of the disclosure may provide synchronized failover of redundant ABR encoders/transcoders to the same (e.g., corresponding) input sources for ABR redundancy.

According to embodiments of the disclosure, source back-up switching may be synchronized between the redundant ABR encoders/transcoders by continuously exchanging the active source for each encoder/transcoder. In case one decides to switch to another source, the redundant ABR encoder/transcoder may be notified and may also switch to the same source to make sure the ABR output profiles stay aligned between the redundant ABR encoders/transcoders.

Figure 1:
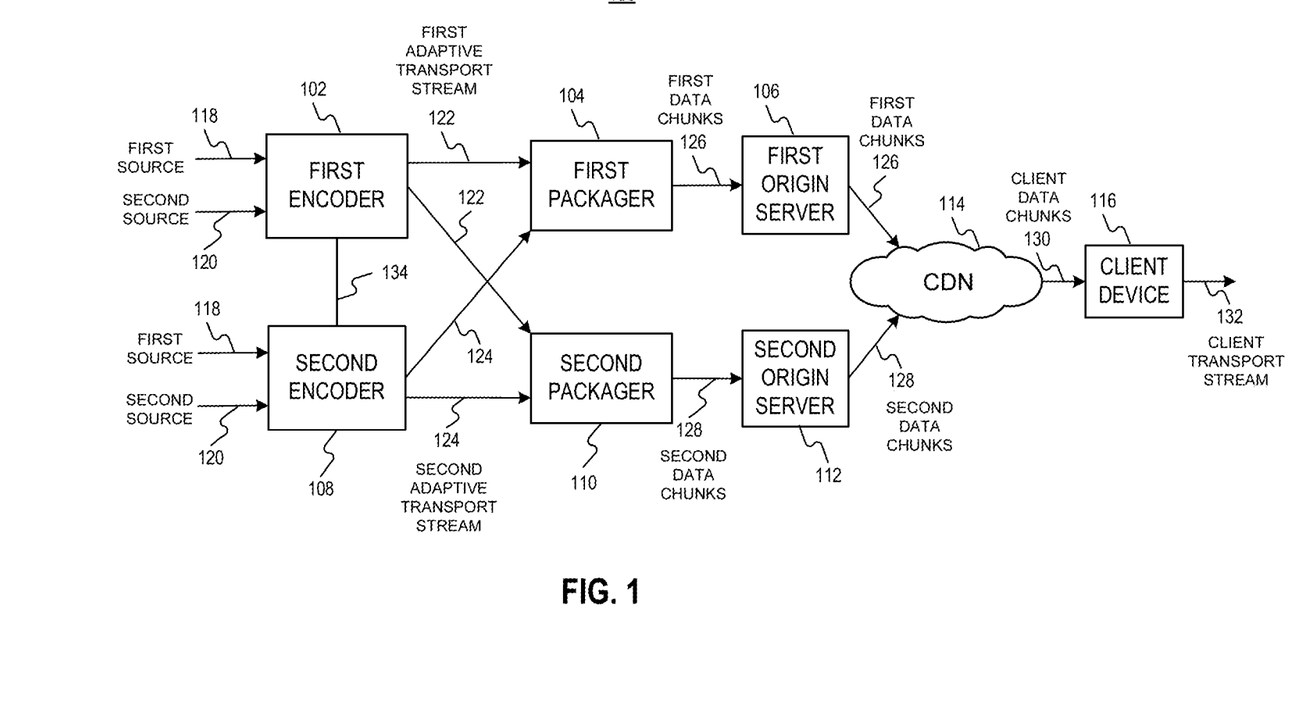
FIG. 1 is a block diagram of a system for providing synchronized source selection for adaptive bitrate (ABR) encoders.

FIG. 1 is a block diagram of system 100 for providing synchronized source selection for adaptive bitrate (ABR) encoders. As shown in FIG. 1, system 100 may comprise a first encoder 102, a first packager 104, a first origin server 106, a second encoder 108, a second packager 110, a second origin server 112, a Content Deliver Network (CDN) 114, and a client device 116.

First encoder 102, first packager 104, first origin server 106, second encoder 108, second packager 110, second origin server 112, and client device 116 may be embodied by computing device 600 described in greater detail below with respect to FIG. 6. Notwithstanding, first encoder 102, first packager 104, first origin server 106, second encoder 108, second packager 110, second origin server 112, and client device 116 may be embodied in hardware and/or in software (including firmware, resident software, micro-code, etc.). Client device 116 may comprise, but is not limited to, a cellular base station, a tablet device, a mobile device, a smartphone, a telephone, a remote control device, a set-top box, a digital video recorder, a cable modem, a personal computer, a network computer, a mainframe, a router, or other similar microcomputer-based device. CDN 114 may comprise a collection of web servers and network components for example.

ABR video and audio may be packaged in small media files (e.g., chunks) that may have a fixed duration (e.g., 2s). Each ABR chunk may be fully decodable on its own (i.e., it may not need previous chunks for decoding). Audio and video that may be contained in an ABR chunk may be aligned (i.e., a first audio sample in the chunk may correspond to a first video sample in the chunk).

With ABR, a single video/audio source may be encoded in multiple representations that may have different resolutions, framerates, and/or bitrates. Each of these representations may be separated into individually decodable chunks. Moreover, the chunk boundaries may be aligned (i.e., the corresponding chunks of the individual representations may start with the same video frame/audio sample). Aligning the chunk boundaries allows an ABR client to seamlessly switch between the available representations at the chunk boundaries. This allows the ABR client to switch to an appropriate representation based on the network bandwidth it has available at a certain moment of time. When the ABR client has a high network bandwidth available, it may switch to a representation that has a higher video resolution, framerate, and bitrate. When the available bandwidth is lower, the ABR client may switch to a representation with a lower video resolution, framerate, and bitrate.

As shown in FIG. 1, client device 116 may start requesting chunks for the lowest representation and then gradually increases the representation resolution and framerate. Towards the end, client device 116 may request a middle representation, for example, because of lowered network congestion. Regardless, in order for the ABR client to seamless switch, the chunks of the individual representations may need to be video frame aligned (and within a chunk, audio may be aligned with video).

Services may be encoded by first encoder 102 and second encoder 108, packaged (i.e., cut in first data chunks 126 and second data chunks 128) by first packager 104 and second packager 110, and delivered using first origin server 106 and second origin server 112 to client device 116 over CDN 114. Client device 116 may receive first data chunks 126 and second data chunks 128 as client data chunks 130 for further processing (e.g., displaying the content) or recording the content (e.g., on a cDVR).

First encoder 102 and second encoder 108 may encode the video/audio source to the video/audio format that may be needed (e.g., H.264 video and AAC audio) and may generate a set of representations of the ABR service (e.g., different resolutions, framerates, and bitrates). First encoder 102 and second encoder 108 may also determine the chunk size and chunk alignment by inserting Encoder Boundary Points (EBPs) into first a first adaptive transport stream (ATS) 122 and a second ATS 124. These EBPs may be inserted, for example, at regular intervals (e.g., 2s) on the video Packet Identification (PID) (alternatives are possible depending on the ABR format).

As illustrated in FIG. 1, first packager 104 may read the EBPs and may create first data chunks 126 that may align with these EBP boundaries. In order to create first data chunks 126, first packager 104 may cut first ATS 122 or second ATS 124 based on the video EBPs. First packager 104 may then manipulate the audio packets to compensate for the difference in video and audio decoding delay (e.g., the video packets may be sent earlier in time than corresponding audio packets). Similarly, second packager 110 may read the EBPs and may create second data chunks 128 that may align with these EBP boundaries. In order to create second data chunks 128, second packager 110 may cut first ATS 122 or second ATS 124 based on the video EBPs. Second packager 110 may then manipulate the audio packets to compensate for the difference in video and audio decoding delay (e.g., the video packets may be sent earlier in time than corresponding audio packets).

These redundant ABR encoders/transcoders (e.g., first encoder 102 and second encoder 108) may place their video chunk boundaries on the same video frames and their audio chunk boundaries on the same audio samples (i.e., the ABR profiles of the ABR encoders/transcoders may be "aligned"). This chunk boundary alignment may be coordinated between first encoder 102 and second encoder 108 via inter-node communications 134. One process for providing the aforementioned alignment is described in U.S. Pat. No. 9,706,509, which is incorporated herein by reference in its entirety. The placement of the aforementioned boundaries may be based upon timestamps present in the input (i.e., the source). In order for redundant ABR encoding/transcoding to be aligned, both main and back-up ABR encoders/transcoders may need to receive a source with same input timestamps as described below with respect to FIG. 2 and FIG. 4.

Figure 2:
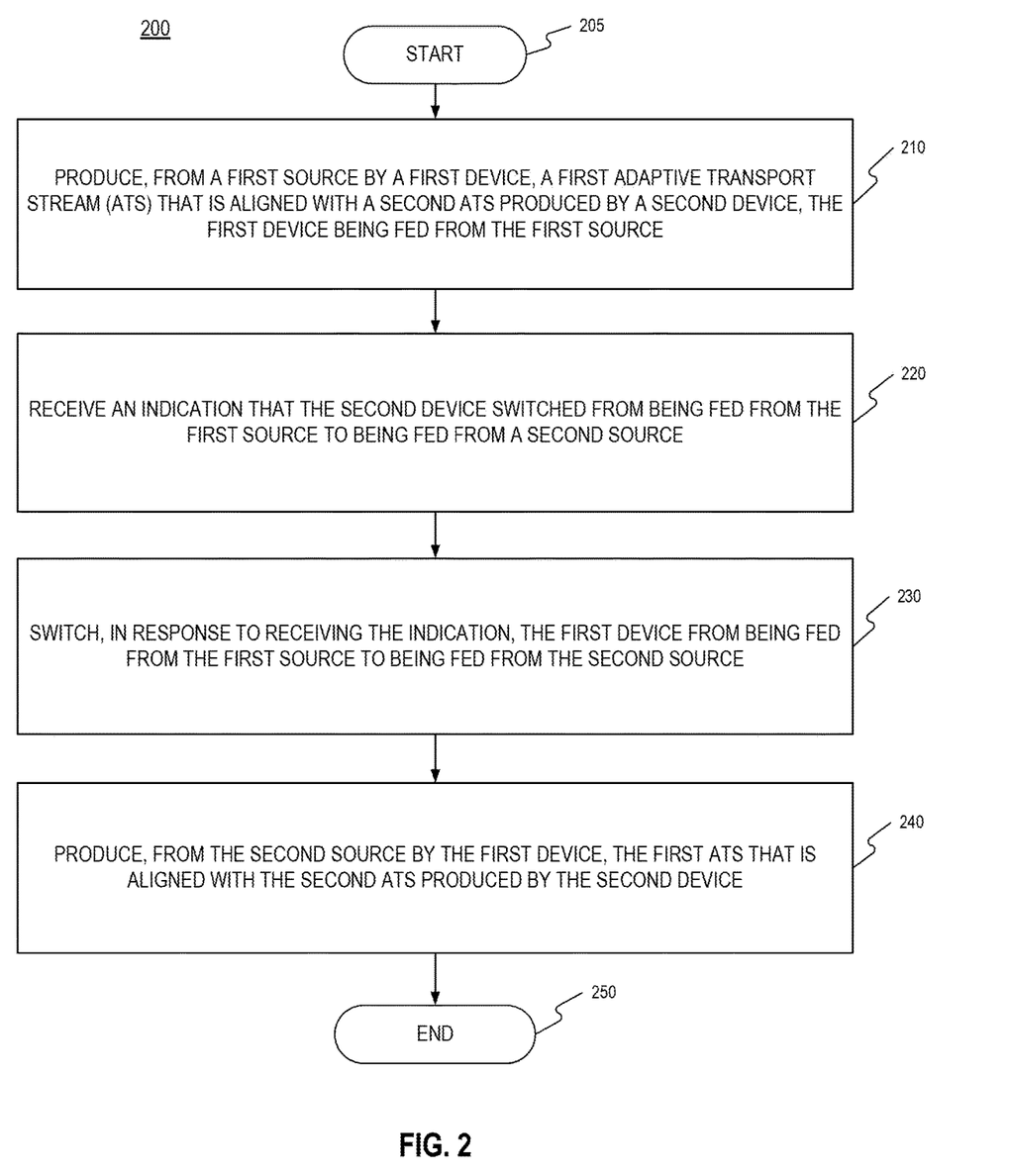
FIG. 2 is a flow chart of a method for providing synchronized source selection for adaptive bitrate (ABR) encoders.

FIG. 2 is a flow chart setting forth the general stages involved in a method 200 consistent with an embodiment of the invention for providing synchronized source selection for adaptive bitrate (ABR) encoders. Method 200 may be implemented using first encoder 102 as described above with respect to FIG. 1 and below with respect to FIG. 3A and FIG. 3B. A computing device 600, as described in more detail below with respect to FIG. 6, may provide an operating environment for first encoder 102. Ways to implement the stages of method 200 will be described in greater detail below.

Figure 3A:
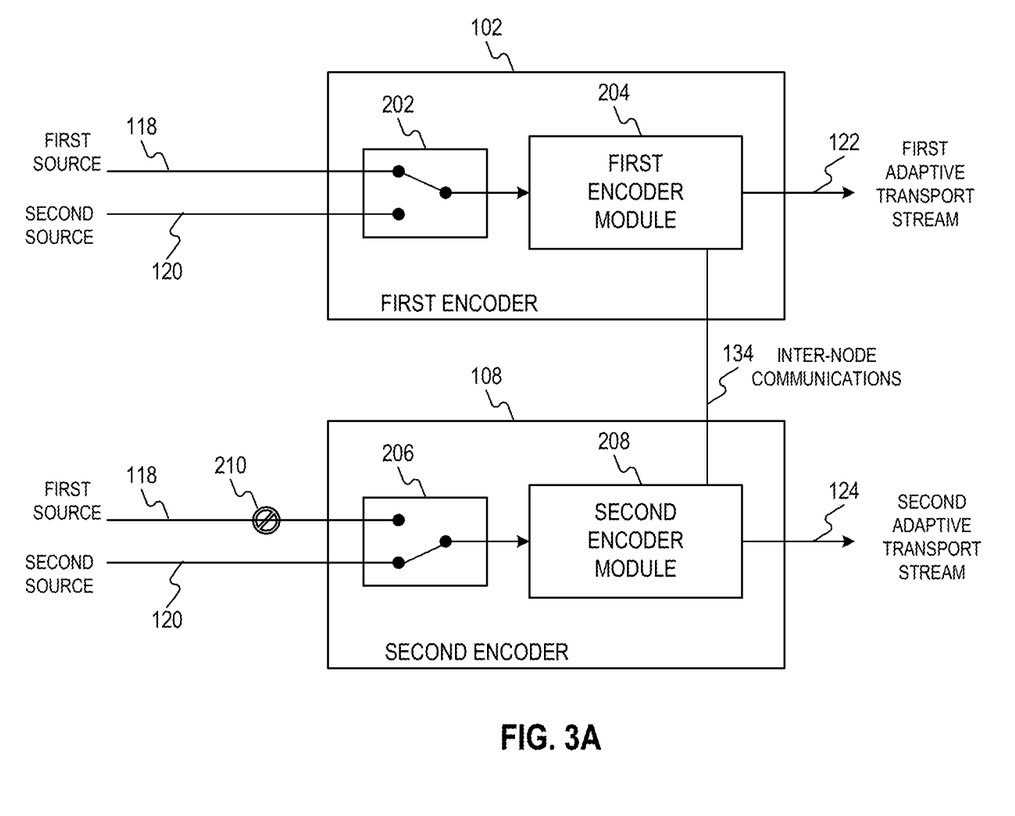
FIG. 3A and FIG. 3B show a first encoder and a second encoder.

Method 200 may begin at starting block 205 and proceed to stage 210 where a first device (e.g., first encoder 102) may produce, from first source 118, first ATS 122 that may be aligned with second ATS 124 produced by a second device (e.g., second encoder 108). The first device (e.g., first encoder 102) and the first device (e.g., second encoder 108) may be fed from first source 118. For example, as shown in FIG. 3A, first encoder 102 may comprise a first encoder switch 302 and a first encoder module 304. Similarly, second encoder 108 may comprise a second encoder switch 306 and a second encoder module 308. First encoder module 304 may comprise hardware and/or in software (including firmware, resident software, micro-code, etc.) to encode first source 118 or second source 120 into first ATS 122 and to select the position of first encoder switch 302. Similarly, second encoder module 308 may comprise hardware and/or in software (including firmware, resident software, micro-code, etc.) to encode first source 118 or second source 120 into second ATS 124 and to select the position of second encoder switch 306. As shown in FIG. 3A, first encoder switch 302 may be in a position that may cause first encoder module 304 of first encoder 102 to produce first ATS 122 from first source 118.

ABR alignment may exist between first ATS 122 and second ATS 124, otherwise first packager 104 and second packager 110 may not select aligned copies from either source (e.g., first ATS 122 and second ATS 124). If first package 104 and second packager 110 select non-aligned copies, non-aligned segments in first data chunks 126 and second data chunks 128 may exist, effectively disturbing the viewer's experience as described above. While ABR alignment may exist between first ATS 122 and second ATS 124 using the alignment process described in U.S. Pat. No. 9,706,509, other alignment process may be used and embodiments of the disclosure are not limited to the process described in U.S. Pat. No. 9,706,509.

From stage 210, where first device (e.g., first encoder 102) produced, from first source 118, first ATS 122 that may be aligned with second ATS 124 produced by second device (e.g., second encoder 108), method 200 may advance to stage 220 where the first device (e.g., first encoder 102) may receive an indication that the second device (e.g., second encoder 108) switched from being fed from first source 118 to being fed from second source 120. For example, second encoder switch 306 may have been in a position that may have caused second encoder module 308 of second encoder 108 to produce second ATS 124 from first source 118. However, as shown in FIG. 3A, a fault 310 may have occurred on first source 118 feeding second encoder 108. Sensing fault 310, second encoder module 308 may have caused second encoder switch 306 to switch to a position that may cause second encoder module 308 of second encoder 108 to produce second ATS 124 from second source 120.

The active source (e.g., first source 118 or second source 120) of each ABR encoder/transcoder (i.e., first encoder 102 and second encoder 108) may be exchanged over inter-node communications 134. By doing this with some frequency, first encoder 102 and second encoder 108 may know if they are using the same source or not. In this way, in case one of first encoder 102 and second encoder 108 switches to another source, the other encoder may be notified and can also switch to the same source to keep the ABR output profiles (e.g., first ATS 122 and second ATS 124) aligned.

Figure 3B:
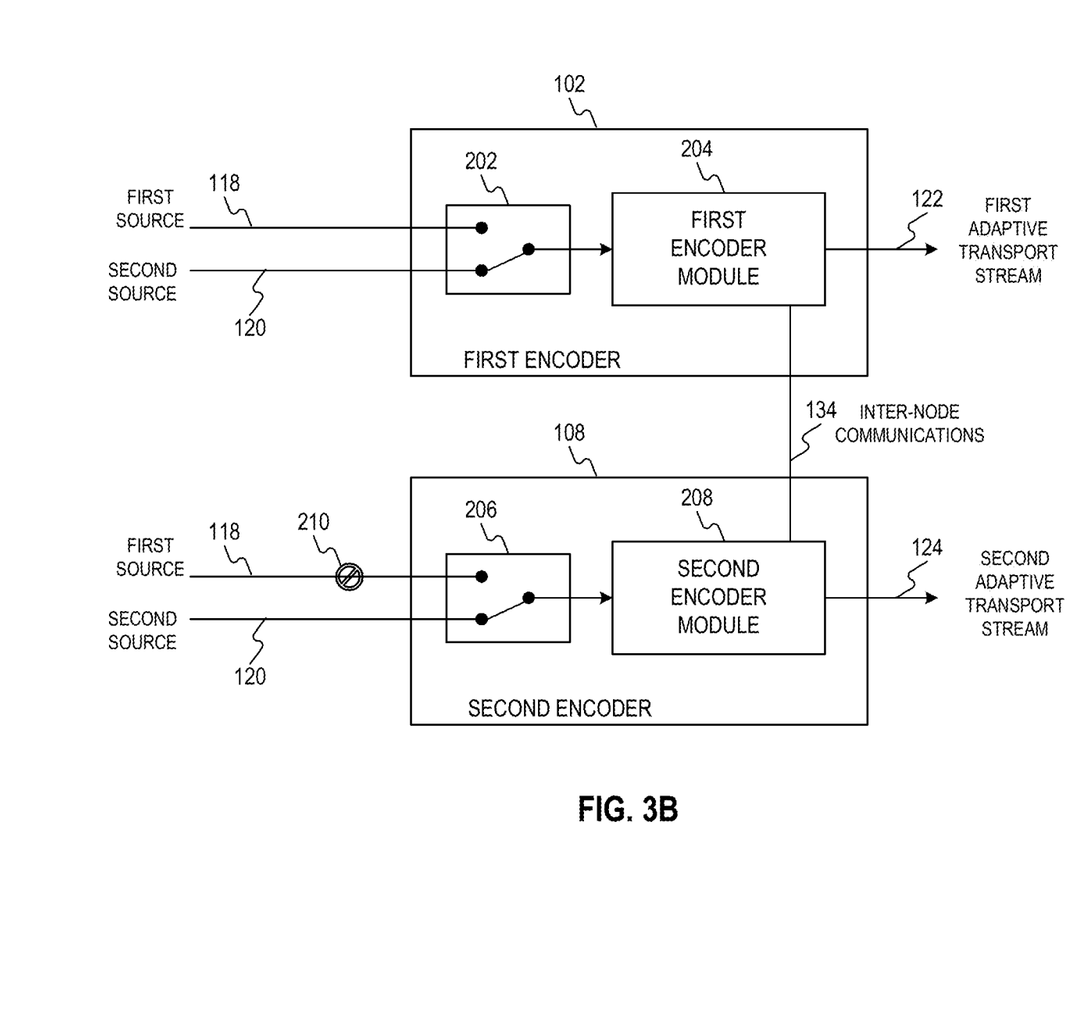

Once the first device (e.g., first encoder 102) receives the indication that the second device (e.g., second encoder 108) switched from being fed from first source 118 to being fed from second source 120 in stage 220, method 200 may continue to stage 230 where the first device (e.g., first encoder 102) may switch, in response to receiving the indication, from being fed from first source 118 to being fed from second source 120. For example, from data (e.g., an indication) received over inter-node communications 134 from second encoder 108, first encoder module 304 may cause first encoder switch 302 to switch to a position that may cause first encoder module 304 of first encoder 102 to produce first ATS 122 from second source 120 as shown in FIG. 3B.

After the first device (e.g., first encoder 102) switches, in response to receiving the indication, from being fed from first source 118 to being fed from second source 120 in stage 230, method 200 may proceed to stage 240 where the first device (e.g., first encoder 102) may produce, from second source 120, first ATS 122 that is aligned with second ATS 124 produced by the second device (e.g., second encoder 108). For example, in case one of first encoder 102 and second encoder 108 switches to another source, the other encoder may be notified and can also switch to the same source to keep the ABR output profiles (e.g., first ATS 122 and second ATS 124) aligned. In other words, in order for first ATS 122 and second ATS 124 to be aligned, both encoders (e.g., first encoder 102 and second encoder 108) may need to receive input from the same source (i.e., with the same input timestamps). Once the first device (e.g., first encoder 102) produces, from second source 120, first ATS 122 that is aligned with second ATS 124 produced by the second device (e.g., second encoder 108) in stage 240, method 200 may then end at stage 250.

Figure 4:
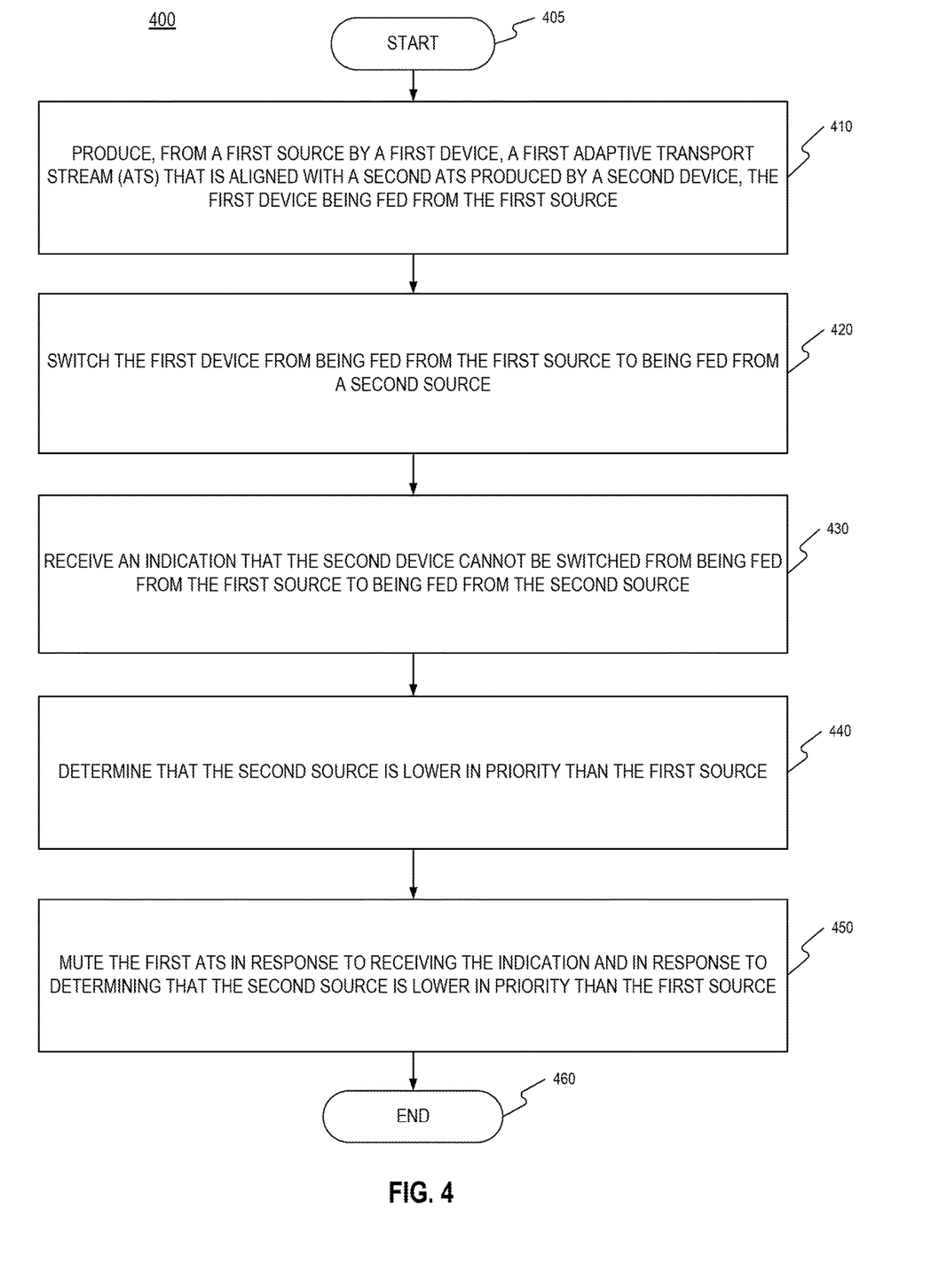
FIG. 4 is a flow chart of a method for providing synchronized source selection for adaptive bitrate (ABR) encoders.

FIG. 4 is a flow chart setting forth the general stages involved in a method 400 consistent with an embodiment of the invention for providing synchronized source selection for adaptive bitrate (ABR) encoders. Method 400 may be implemented using first encoder 102 as described above with respect to FIG. 1 and below with respect to FIG. 5A and FIG. 5B. Computing device 600, as described in more detail below with respect to FIG. 6, may provide an operating environment for first encoder 102. Ways to implement the stages of method 400 will be described in greater detail below.

Figure 5A:
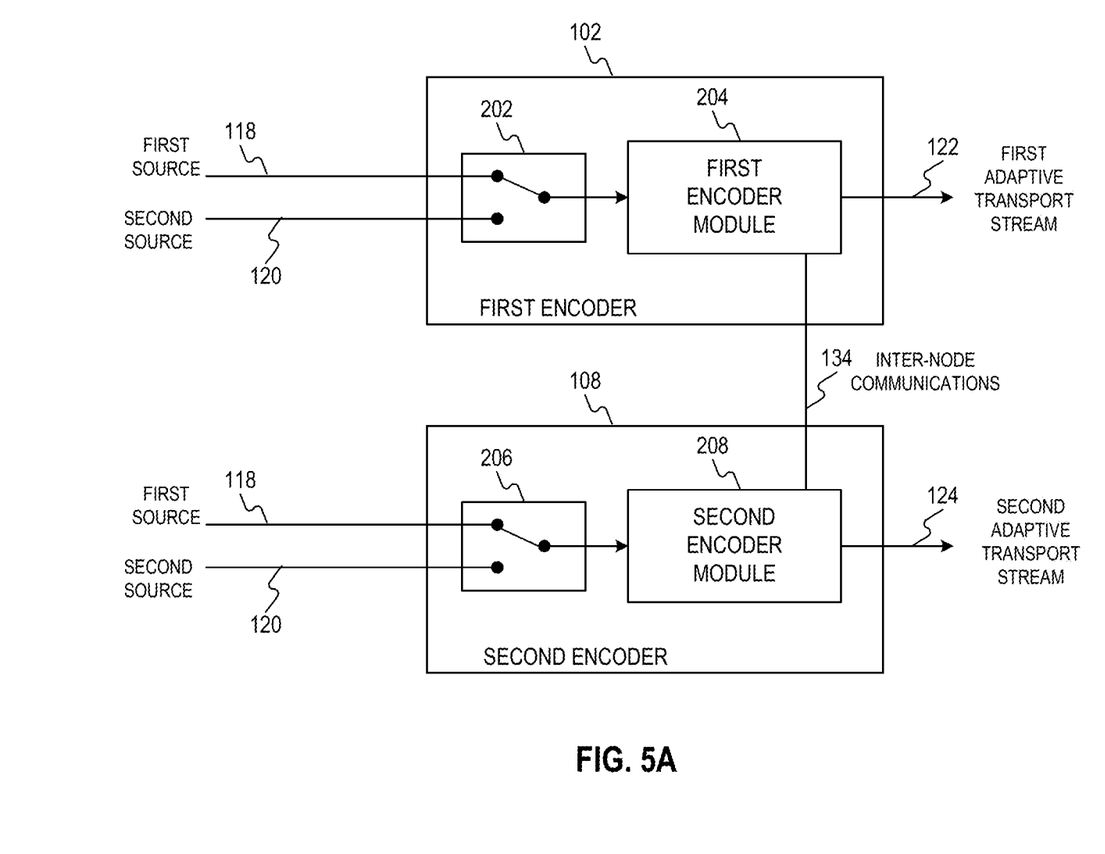
FIG. 5A and FIG. 5B show a first encoder and a second encoder.

Method 400 may begin at starting block 405 and proceed to stage 410 where the first device (e.g., first encoder 102) may produce, from first source 118, first ATS 122 that is aligned with second ATS 124 produced by the second device (e.g., second encoder 108). The first device (e.g., first encoder 102) and the second device (e.g., second encoder 108) may be fed from first source 118. For example, as shown in FIG. 5A, first encoder switch 302 may be in a position that may cause first encoder module 304 of first encoder 102 to produce first ATS 122 from first source 118. Similarly, second encoder switch 306 may be in a position that may cause second encoder module 308 of second encoder 108 to produce second ATS 124 from first source 118. First ATS 122 and second ATS 124 may be aligned because both encoders (e.g., first encoder 102 and second encoder 108) may receive input from the same source (i.e., with the same input timestamps).

Figure 5B:
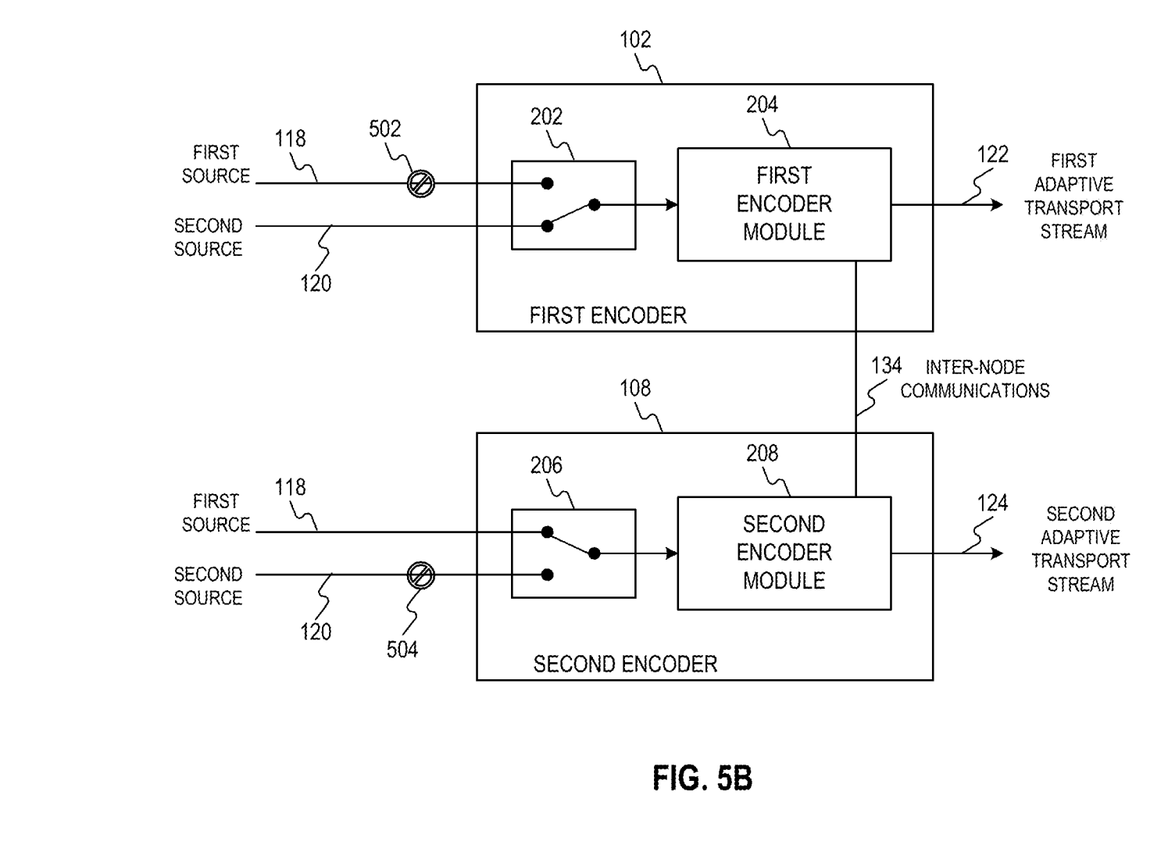

From stage 410, where the first device (e.g., first encoder 102) produces, from first source 118, first ATS 122 that is aligned with second ATS 124 produced by the second device (e.g., second encoder 108), method 400 may advance to stage 420 where the first device (e.g., first encoder 102) may switch the first device (e.g., first encoder 102) from being fed from first source 118 to being fed from second source 120. For example, as shown in FIG. 5B, a first fault 502 may have occurred on first source 118 feeding first encoder 102. Sensing first fault 502, first encoder module 304 may cause first encoder switch 302 to switch to a position that may cause first encoder module 304 of first encoder 102 to produce first ATS 122 from second source 120. As a result, first ATS 122 and second ATS 124 may not be aligned because both encoders (e.g., first encoder 102 and second encoder 108) may not be receiving input from the same source (i.e., with the same input timestamps).

Once the first device (e.g., first encoder 102) switches the first device (e.g., first encoder 102) from being fed from first source 118 to being fed from second source 120 in stage 420, method 400 may continue to stage 430 where the first device (e.g., first encoder 102) may receive an indication that the second device (e.g., second encoder 108) cannot be switched from being fed from first source 118 to being fed from second source 120. For example, second encoder module 308 may sense a second fault 504 and know that it cannot switch to second source 120 because second source 120 is not available. The available sources (e.g., first source 118 or second source 120) of each ABR encoder/transcoder (i.e., first encoder 102 and second encoder 108) may be exchanged over inter-node communications 134. By doing this with some frequency, first encoder 102 and second encoder 108 may know which sources are available or not available to the other encoder.

After the first device (e.g., first encoder 102) receives the indication that the second device (e.g., second encoder 108) cannot be switched from being fed from first source 118 to being fed from second source 120 in stage 430, method 400 may proceed to stage 440 where the first device (e.g., first encoder 102) may determine that second source 120 is lower in priority than first source 118. For example, first encoder 102 and second encoder 108 may receive a list indicating a priority relationship between the sources (e.g., first source 118 and second source 120). From this list, first encoder 102 may determine that second source 120 is lower in priority than first source 118.

From stage 440, where the first device (e.g., first encoder 102) determines that second source 120 is lower in priority than first source 118, method 400 may advance to stage 450 where the first device (e.g., first encoder 102) may mute first ATS 122 in response to receiving the indication and in response to determining that second source 120 is lower in priority than first source 118. For example, first encoder 102 and second encoder 108 cannot both use the same source at the same time (e.g., in the case of multiple source losses as shown in FIG. 5B). The ABR encoder/transcoder that has access to the highest priority source may continue outputting the ABR encoded/transcoded content, while the other ABR encoder/transcoder may mute its output. This may avoid an un-alignment situation. For the example shown in FIG. 5B, first encoder 102 may mute first ATS 122 because second source 120 may be lower in priority that first source 118. Because second encoder 108 has access to the highest priority source (e.g., first source 118), second encoder 108 may continue outputting second ATS 124.

In the case of double failure as shown in FIG. 5B, where first encoder 102 and second encoder 108 may not have access to the same source at the same time, the alignment issue may not be solved by selecting the same source. Consequently, one encoder may mute its output (e.g., based on source priority). Redundancy may be broken, but downstream devices (e.g., client device 116) may not suffer from unaligned sources as described above. Once the first device (e.g., first encoder 102) mutes first ATS 122 in response to receiving the indication and in response to determining that second source 120 is lower in priority than first source 118 in stage 440, method 400 may then end at stage 450.

Figure 6:
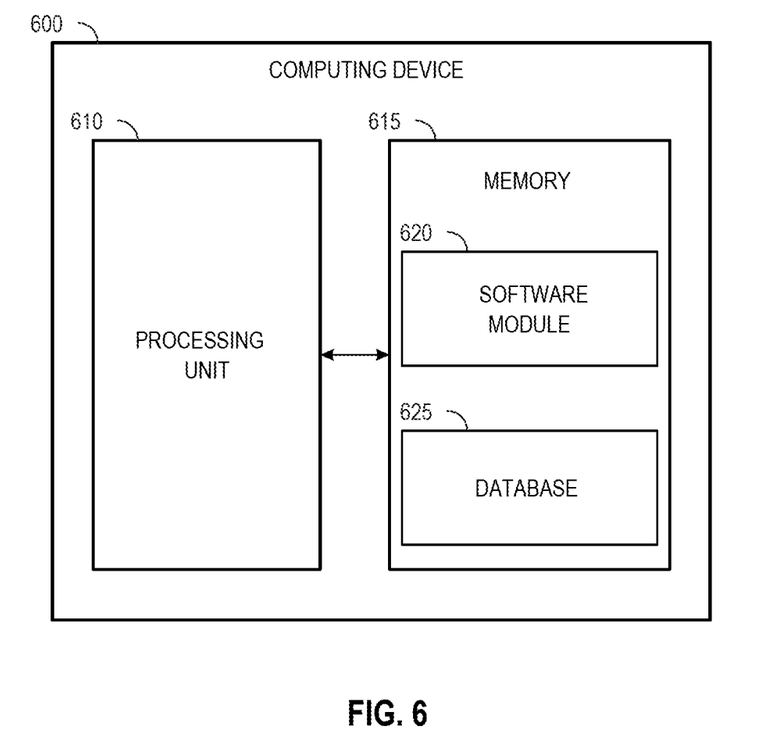
FIG. 6 is a block diagram of a computing device.

FIG. 6 shows computing device 600. As shown in FIG. 6, computing device 600 may include a processing unit 610 and a memory unit 615. Memory unit 615 may include a software module 620 and a database 625. While executing on processing unit 610, software module 620 may perform processes for providing synchronized source selection for adaptive bitrate (ABR) encoders, including for example, any one or more of the stages from method 200 described above with respect to FIG. 2 and any one or more of the stages from method 400 described above with respect to FIG. 4. Computing device 600 may provide an operating environment for any one or more of first encoder 102, first packager 104, first origin server 106, second encoder 108, second packager 110, second origin server 112, and client device 116. First encoder 102, first packager 104, first origin server 106, second encoder 108, second packager 110, second origin server 112, and client device 116 may operate in other environments and are not limited to computing device 600.

Computing device 600 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, an encoder, a transcoder, a camera, a load balancer or other similar microcomputer-based device. Computing device 600 may comprise any computer operating environment, such as hand-held devices, multiprocessor systems, microprocessor-based or programmable sender electronic devices, minicomputers, mainframe computers, and the like. Computing device 600 may also be practiced in distributed computing environments where tasks are performed by remote processing devices. The aforementioned systems and devices are examples and computing device 600 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including, but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   producing, from a first source by a first device, a first adaptive transport stream (ATS) that is aligned with a second ATS produced by a second device, the first device being fed from the first source;
   receiving, by the first device, an indication that the second device switched from being fed from the first source to being fed from a second source wherein receiving the indication that the second device switched from being fed from the first source to being fed from a second source comprises periodically receiving data from the second device indicating which source it is being fed from;
   switching, in response to receiving the indication, the first device from being fed from the first source to being fed from the second source; and
   producing, from the second source by the first device, the first ATS that is aligned with the second ATS produced by the second device.

2. The method of claim 1, wherein producing, from the first source by the first device, the first ATS that is aligned with the second ATS produced by the second device comprises producing the first ATS with video chunk boundaries on same video frames as the second ATS.

3. The method of claim 1, wherein producing, from the first source by the first device, the first ATS that is aligned with the second ATS produced by the second device comprises producing the first ATS with audio chunk boundaries on same audio samples as the second ATS.

4. The method of claim 1, wherein producing, from the second source by the first device, the first ATS that is aligned with the second ATS produced by the second device comprise producing the first ATS with video chunk boundaries on same video frames as the second ATS.

5. The method of claim 1, wherein producing, from the second source by the first device, the first ATS that is aligned with the second ATS produced by the second device comprises producing the first ATS with audio chunk boundaries on same audio samples as the second ATS.

6. A method comprising:
   producing, from a first source by a first device, a first adaptive transport stream (ATS) that is aligned with a second ATS produced by a second device, the first device being fed from the first source;
   switching the first device from being fed from the first source to being fed from a second source;
   receiving an indication that the second device cannot be switched from being fed from the first source to being fed from the second source;
   determining that the second source is lower in priority than the first source; and muting the first ATS in response to receiving the indication and in response to determining that the second source is lower in priority than the first source.

7. The method of claim 6, wherein producing, from the first source by the first device, the first ATS that is aligned with the second ATS produced by the second device comprises producing the first ATS with video chunk boundaries on same video frames as the second ATS.

8. The method of claim 6, wherein producing, from the first source by the first device, the first ATS that is aligned with the second ATS produced by the second device comprises producing the first ATS with audio chunk boundaries on same audio samples as the second ATS.

9. The method of claim 6, wherein receiving the indication that the second device cannot be switched from being fed from the first source to being fed from the second source comprises periodically receiving data from the second device indicating which sources are available to the second device.

10. The method of claim 6, wherein the first source and the second source do not contain same timestamps.

11. The method of claim 6, wherein determining that the second source is lower in priority than the first source comprises determining that the second source is lower in priority than the first source based upon a source priority list received by the first device.

12. A system comprising:
a memory storage; and
a processing unit disposed in a first device coupled to the memory storage, wherein the processing unit is operative to:
produce, from a first source, a first adaptive transport stream (ATS) that is aligned with a second ATS produced by a second device, the first device being fed from the first source;
receive an indication that the second device switched from being fed from the first source to being fed from a second source wherein the processing unit being operative to receive the indication that the second device switched from being fed from the first source to being fed from a second source comprises the processing unit being operative to periodically receive data from the second device indicating which source it is being fed from;
switch, in response to receiving the indication, the first device from being fed from the first source to being fed from the second source; and
produce, from the second source, the first ATS that is aligned with the second ATS produced by the second device.

13. The system of claim 12, wherein the processing unit being operative to produce, from the first source, the first ATS that is aligned with the second ATS produced by the second device comprises the processing unit being operative to produce the first ATS with video chunk boundaries on same video frames as the second ATS.

14. The system of claim 12, wherein the processing unit being operative to produce, from the first source, the first ATS that is aligned with the second ATS produced by the second device comprises the processing unit being operative to produce the first ATS with audio chunk boundaries on same audio samples as the second ATS.

15. The system of claim 12, wherein the processing unit being operative to produce, from the second source, the first ATS that is aligned with the second ATS produced by the second device comprise the processing unit being operative to produce the first ATS with video chunk boundaries on same video frames as the second ATS.

16. The system of claim 12, wherein the processing unit being operative to produce, from the second source, the first ATS that is aligned with the second ATS produced by the second device comprises the processing unit being operative to produce the first ATS with audio chunk boundaries on same audio samples as the second ATS.

* * * * *